(12) United States Patent
Tessier et al.

(10) Patent No.: US 8,999,582 B2
(45) Date of Patent: Apr. 7, 2015

(54) POSITIVE ELECTRODE MATERIAL FOR LITHIUM-ION ACCUMULATOR

(75) Inventors: Cecile Tessier, Bruges (FR); Julien Breger, Bordeaux (FR); Olivier Jan, Libourne (FR); Philippe Biensan, Carignan de Bordeaux (FR); Bridget Deveney, Baltimore, MD (US); Kamen Nechev, Cockeysville, MD (US)

(73) Assignee: SAFT Groupe SA, Bagnolet (FR)

( * ) Notice: Subject to any disclaimer, the term of this patent is extended or adjusted under 35 U.S.C. 154(b) by 826 days.

(21) Appl. No.: 12/821,709

(22) Filed: Jun. 23, 2010

(65) Prior Publication Data

US 2010/0320972 A1    Dec. 23, 2010

Related U.S. Application Data

(60) Provisional application No. 61/221,730, filed on Jun. 30, 2009.

(30) Foreign Application Priority Data

Jun. 23, 2009   (FR) ...................................... 09 03045

(51) Int. Cl.
*H01M 4/131* (2010.01)
*C01B 25/30* (2006.01)
(Continued)

(52) U.S. Cl.
CPC ................ *C01B 25/30* (2013.01); *C01B 25/37* (2013.01); *C01B 25/375* (2013.01); *C01B 25/45* (2013.01); *C01D 15/02* (2013.01); *C01G 53/006* (2013.01); *C04B 35/01* (2013.01); *C04B 35/447* (2013.01); *C04B 35/62839* (2013.01); *H01M 4/131* (2013.01); *H01M 4/136* (2013.01); *H01M 4/485* (2013.01); *H01M 4/525* (2013.01); *H01M 4/5825* (2013.01); *H01M 10/052* (2013.01); *H01M 10/0525* (2013.01); *C01G 49/009* (2013.01); *C01G 51/50* (2013.01); *C01G 53/50* (2013.01); *H01M 4/13* (2013.01); *C01P 2006/40* (2013.01); *C04B 2235/3203* (2013.01); *C04B 2235/3218* (2013.01); *C04B 2235/3262* (2013.01); *C04B 2235/3272* (2013.01); *C04B 2235/3275* (2013.01); *C04B 2235/3279* (2013.01); *C04B 2235/447* (2013.01);
(Continued)

(58) Field of Classification Search
USPC ...................................................... 429/231.95
See application file for complete search history.

(56) References Cited

U.S. PATENT DOCUMENTS 6,783,890 B2 *   8/2004   Kweon et al. .............. 429/218.1
7,332,248 B2 *   2/2008   Kase et al. .................. 429/231.3
(Continued)

FOREIGN PATENT DOCUMENTS

EP        1 548 861 A1    6/2005
WO    2007/087714 A1    8/2007

*Primary Examiner* — Jeremiah Smith
(74) *Attorney, Agent, or Firm* — Sughrue Mion, PLLC

(57) ABSTRACT

A composition including (a) a lithiated oxide of transition metals containing at least nickel, cobalt and aluminum and (b) a lithiated phosphate of at least one transition metal, the surface of which is at least partially covered by a layer of carbon. In the composition, the proportion by mass of the lithiated oxide of transition metals containing at least nickel, cobalt and aluminum is less than or equal to 10% of the weight of the composition, and the proportion by mass of the lithiated phosphate of at least one transition metal is greater than or equal to 90% of the weight of the composition. A lithium-ion or lithium-polymer type accumulator including at least one positive electrode containing this composition.

28 Claims, 9 Drawing Sheets

(51) Int. Cl.

| | | |
|---|---|---|
| *C01B 25/37* | (2006.01) | |
| *C01B 25/45* | (2006.01) | |
| *C01D 15/02* | (2006.01) | |
| *C01G 53/00* | (2006.01) | |
| *C04B 35/01* | (2006.01) | |
| *C04B 35/447* | (2006.01) | |
| *C04B 35/628* | (2006.01) | |
| *H01M 4/136* | (2010.01) | |
| *H01M 4/485* | (2010.01) | |
| *H01M 4/525* | (2010.01) | |
| *H01M 4/58* | (2010.01) | |
| *H01M 10/052* | (2010.01) | |
| *H01M 10/0525* | (2010.01) | |
| *C01G 49/00* | (2006.01) | |
| *C01G 51/00* | (2006.01) | |
| *H01M 4/13* | (2010.01) | |
| *H01M 4/02* | (2006.01) | |

(52) U.S. Cl.
CPC ........ *H01M2004/028* (2013.01); *Y02E 60/122* (2013.01); *Y02T 10/7011* (2013.01); *C01P 2002/52* (2013.01); *C01P 2002/88* (2013.01); *C01P 2004/80* (2013.01)

(56) References Cited

U.S. PATENT DOCUMENTS

| | | | |
|---|---|---|---|
| 2003/0054245 A1* | 3/2003 | Barton et al. | 429/212 |
| 2004/0091778 A1* | 5/2004 | Ozaki et al. | 429/231.1 |
| 2006/0216605 A1 | 9/2006 | Shirakata et al. | |
| 2007/0057228 A1* | 3/2007 | Huang et al. | 252/182.1 |
| 2007/0072082 A1* | 3/2007 | Scott et al. | 429/231.95 |
| 2008/0268342 A1* | 10/2008 | Suzuki et al. | 429/231.5 |

\* cited by examiner

POSITIVE ELECTRODE MATERIAL FOR LITHIUM-ION ACCUMULATOR

CROSS-REFERENCE TO RELATED APPLICATION

This application relates to and claims the benefit of priority from French Patent Application No. 09 03045, filed on Jun. 23, 2009 and U.S. Provisional Application No. 61/221,730, filed Jun. 30, 2009, the entire disclosures of which are incorporated herein by reference.

TECHNICAL FIELD

The technical field of the invention is that of electrochemically active materials intended to be used in the positive electrode (or cathode) of a rechargeable electrochemical lithium generator (secondary cell or accumulator).

PRIOR ART

The lithiated oxides of transition metals are known as cathode active materials which can be used in rechargeable electrochemical lithium generators. In the positive electrode, lithium oxides of transition metals of general formula $LiMO_2$, where M represents at least one transition metal, such as Mn, Ni, Co, Al or a mixture thereof are used most often as active material. These active materials make it possible to obtain high performances, in particular in terms of reversible cycling capacity and lifetime.

The lithiated oxides of transition metals of formula $LiMO_2$, where M represents the elements nickel, cobalt and aluminium have a good cycling lifetime but have the drawback of being, on the one hand, expensive and, on the other hand, unstable at high temperature. The high-temperature instability of this type of materials can constitute a risk to the user of the electrochemical generator when the latter is operating outside its nominal conditions.

This is why other types of active material having a lower cost and a better thermal stability have been studied, among them lithiated phosphates of at least one transition metal, in particular compounds based on $LiFePO_4$. However, an obstacle to the use of these compounds is their low capacity, their low electronic conductivity, and the fact that $LiFePO_4$ and $FePO_4$ are poor ionic conductors. It is therefore necessary to add to the electrode a large proportion of a conductive material, which impairs its performances, in particular its cycling characteristics.

It is known from the document EP-A-1 548 861 to prepare an active material constituted by a mixture of a lithium oxide and at least one transition metal with a lithium phosphate and at least one transition metal. This document describes a proportion of lithium phosphate and at least one transition metal comprised between 1 and 50% of the weight of the mixture.

The document US 2007/0057228 proposes an active material composition having at the same time a high electrochemical capacity, a high voltage and an increased safety of use. This composition comprises a mixture containing:
 a lithiated oxide of at least one transition metal chosen from Co, Ni, Al, Mg, Mn, Cr and Ti; and
 a lithiated phosphate of at least one transition metal.
The proportion by mass of the lithiated oxide of at least one transition metal can range from 5 to 99% by weight of the composition. The proportion by mass of the lithiated phosphate of at least one transition metal can range from 95 to 1% by weight of the composition.

The document US 2006/0216605 proposes an active material composition comprising a mixture:
 of a lithiated oxide containing at least Ni or Mn, and preferably containing Co; with
 a lithiated phosphate of at least one transition metal.
The proportion by mass of the lithiated phosphate of at least one transition metal can range from 20 to 99% by weight of the composition. It is stated in this document that an accumulator comprising this active material in the positive electrode retains a low internal resistance when it is stored at a high temperature.

An accumulator having a lower internal resistance than the accumulators described in the document US 2006/0216605 and also having a good thermal stability and a good cycling behaviour is sought.

SUMMARY OF THE INVENTION

A subject of the invention is a composition comprising:
 a) a lithiated oxide of transition metals containing at least nickel, cobalt and aluminium;
 b) a lithiated phosphate of at least one transition metal, the surface of which is at least partially covered by a layer of carbon,
 the proportion by mass of the lithiated oxide of transition metals containing at least nickel, cobalt and aluminium, being less than or equal to 10% of the weight of the composition;
 the proportion by mass of the lithiated phosphate of at least one transition metal being greater than or equal to 90% of the weight of the composition.

According to an embodiment, the lithiated phosphate of at least one transition metal has the formula $Li_aM_bP_cO_{4-t}$ where
 M is chosen from Fe, Mn, Co and Ni, preferably Fe;
 a, b and c range from 0.9 to 1.1;
 t is less than or equal to 0.4.

According to an embodiment, the lithiated phosphate of at least one transition metal has the formula $LiFePO_4$.

According to an embodiment, the lithiated oxide of transition metals containing at least nickel, cobalt and aluminium has the formula $Li_w(Ni_xCo_yAl_z)O_2$, where
 w ranges from 0.9 to 1.1;

$x>0$;

$y>0$;

$z>0$.

According to an embodiment:

$0.70 \leq x \leq 0.9$;

$0.05 \leq y \leq 0.25$;

$z \leq 0.10$ and $x+y+z=1$.

According to an embodiment:

$0.75 \leq x \leq 0.85$;

$0.10 \leq y \leq 0.20$.

According to an embodiment, x=0.80; y=0.15 and z=0.05.

According to an embodiment, the proportion by mass of the lithiated phosphate of at least one transition metal is from 90 to 99% of the weight of the composition, and the proportion by mass of the lithiated oxide of transition metals containing at least nickel, cobalt and aluminium is from 1 to 10% of the weight of the composition.

According to an embodiment, the proportion by mass of the lithiated phosphate of at least one transition metal is from 95 to 99% of the weight of the composition, and the proportion by mass of the lithiated oxide of transition metals containing at least nickel, cobalt and aluminium is from 1 to 5% of the weight of the composition.

A subject of the invention is also an electrode comprising the composition according to the invention.

According to one embodiment, the electrode exhibits a loading higher than 8 mg/cm$^2$/s, preferably at least 10 mg/cm$^2$/s and more preferably at least 20 mg/cm$^2$/s.

According to one embodiment, the electrode has a ASI value measured for a discharge current of 30 C during 15 s of less 55000 Ohm.cm$^2$, preferably less than 45000 Ohm.cm$^2$, or a ASI value measured for a discharge current of 20 C during 5 s of less than 65 000 Ohm.cm$^2$, preferably of less than 55000 Ohm.cm$^2$, for a state of charge of about 50%.

A subject of the invention is also an accumulator comprising:
- a non-aqueous electrolyte,
- at least one negative electrode, and
- at least one positive electrode as described previously.

According to an embodiment, the accumulator is of lithium-ion or lithium-polymer type.

Finally, the invention concerns a process of charging the accumulator at a charging current of at least 2 C wherein the charged capacity represents at least 150% of the nominal capacity for a cut-off voltage of 3.6 V or at least 140% of the nominal capacity for a cut-off voltage of 4.1 V.

According to one embodiment, the charged capacity represents at least 155% of the nominal capacity for a cut-off voltage of 3.6 V or at least 145% of the nominal capacity for a cut-off voltage of 4.1 V.

BRIEF DESCRIPTION OF THE FIGURES

In the figures, the material Li(Ni$_{0.8}$Co$_{0.15}$Al$_{0.05}$)O$_2$ is represented by the abbreviation NCA and LiFePO$_4$ is represented by the abbreviation LFP.

The discharge test is carried out at a current of 30 C during 15 s.

DETAILED DISCLOSURE OF THE EMBODIMENTS

The invention relates to an electrochemically active material comprising a composition constituted by a mixture:
- of a lithiated phosphate of at least one transition metal, which is hereafter designated by the abbreviation LMP, with
- a lithiated oxide of transition metals containing at least nickel, cobalt and aluminium, which is hereafter designated by the abbreviation NCA.

The proportion by mass of NCA is less than or equal to 10%, preferably comprised between 1 and 10%, and even more preferably comprised between 1 and 5% of the weight of the composition. Above 10% NCA, the internal resistance of the active material does not significantly decrease.

The proportion by mass of LMP is greater than or equal to 90%, preferably comprised between 90 and 99%, preferably also comprised between 95 and 99% of the weight of the composition.

According to an embodiment, the lithiated phosphate of at least one transition metal has the formula: Li$_a$M$_b$P$_c$O$_{4-t}$ where a, b, c and t satisfy the following relationships: 0.9≤a, b, c≤1.1; 0≤t≤0.4. The transition metal can be chosen from Fe, Ni, Co, Mn, preferably Fe. LiFePO$_4$ is preferably used.

According to an embodiment, the lithiated oxide of transition metals containing at least nickel, cobalt and aluminium has the formula Li$_w$(Ni$_x$Co$_y$Al$_z$)O$_2$, where w ranges from 0.9 to 1.1 and x, y and z are all strictly positive. According to a preferred embodiment, 0.70≤x≤0.9; 0.05≤y≤0.25; z≤0.10 and x+y+z=1.

According to a particularly preferred embodiment 0.75≤x≤0.85 and 0.10≤y≤0.20.

According to a particularly preferred embodiment, the NCA has the formula Li(Ni$_{0.8}$Co$_{0.15}$Al$_{0.05}$)O$_2$.

According to the invention, the surface of the material LMP is at least partially, preferably completely, covered by a layer of carbon. The LMP can be reduced to powder form by mechanical grinding. The particles obtained are then covered with a layer of carbon. Reference can be made to the Patent Application US 2002/01955591 which discloses a method for coating grains of an active material with carbon.

Figure 6:
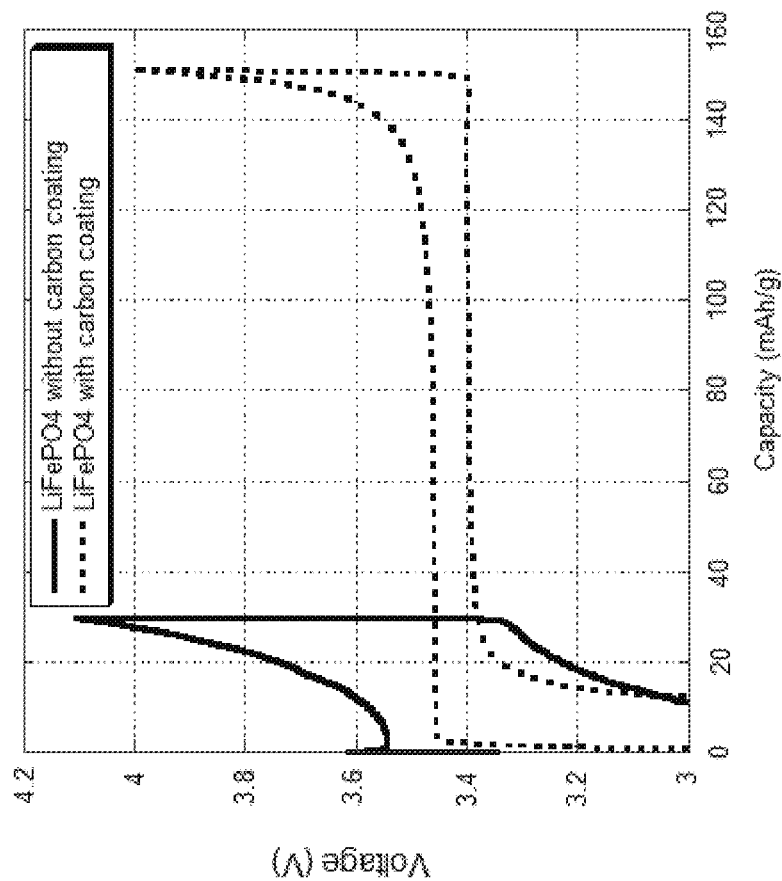
FIG. 6: Charging/discharging curves (1$^{st}$ cycle) produced at ambient temperature and at C/20 in button cells vs. metal Li, for LiFePO$_4$ coated or not coated with carbon.

It was found that coating the LMP particles with carbon had the effect of reducing its electrical resistance and increasing its electrochemical capacity. FIG. 6 illustrates the effect of the carbon coating on the electrochemical capacity of LMP.

Figure 5:
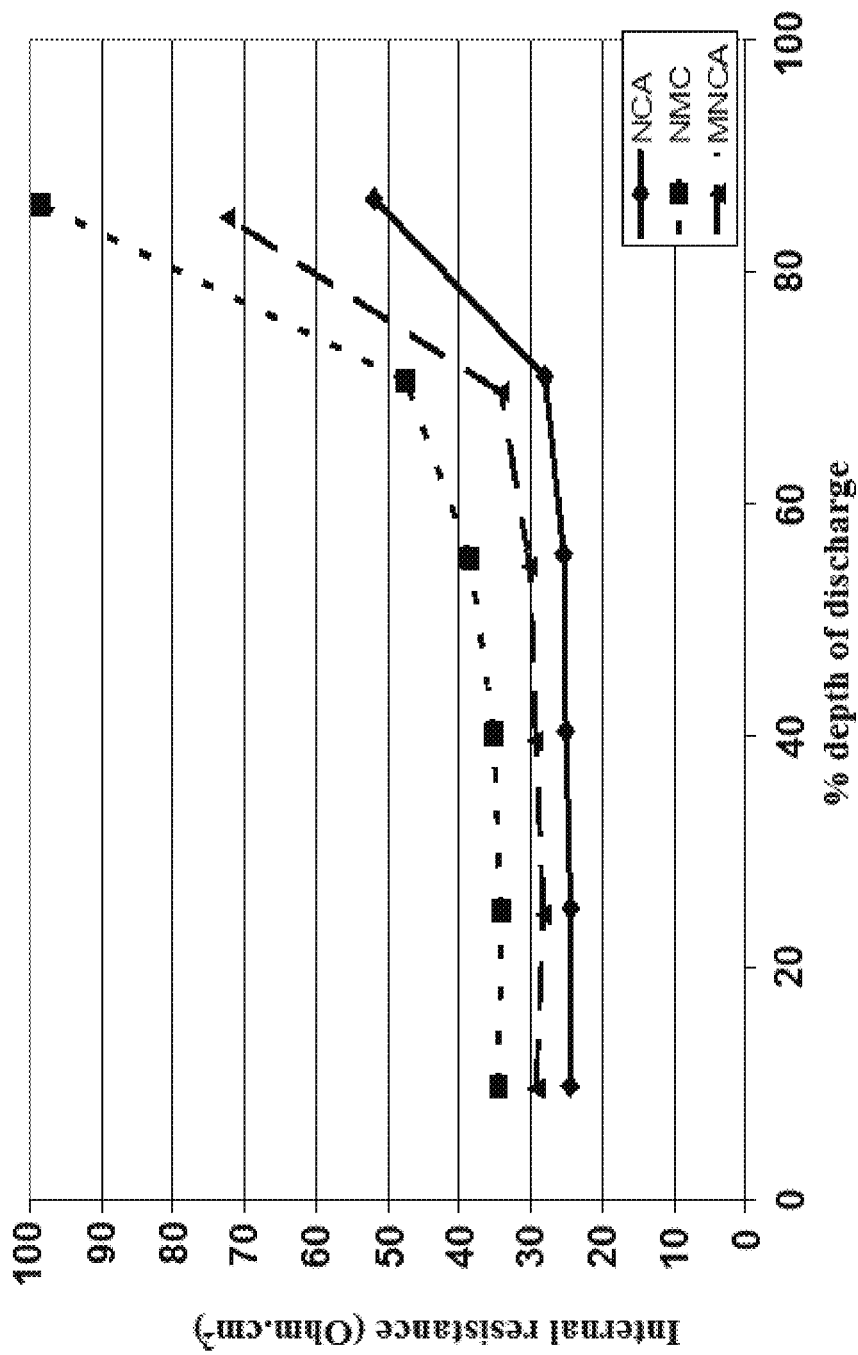
FIG. 5: Standardized internal resistance values (in ohm.cm$^2$) in different states of discharge (Depth of Discharge, or % DOD) obtained when discharging at 30° C. using 10 s current pulses for:
- a lithiated oxide containing nickel, cobalt and aluminium (NCA),
- a lithiated oxide containing nickel, cobalt, manganese and aluminium (NMCA), and
- a lithiated oxide containing nickel, cobalt and manganese (NMC).

It was also surprisingly noted that the addition of aluminium to a lithiated oxide of transition metals had the effect of increasing its electronic conductivity, in other words of reducing its internal resistance. FIG. 5 illustrates this effect. In fact, it represents the internal resistance values of complete accumulators comprising a graphite anode, calculated from a discharge at C/5 up to 2.5V with current discharge peaks of 20 C for 10 s in different states of discharge, for three different positive electrode materials:
NCA (Ni, Co, Al),
NMCA: a lithiated oxide containing Ni, Mn, Co, Al and
NMC: a lithiated oxide containing Ni, Mn and Co.

The results show that the lowest internal resistance values are obtained when aluminium is present in the lithiated oxide, and more particularly with NCA.

It was also surprisingly noted that the presence of aluminium in the NCA, combined with a carbon coating of the particles of LMP, made it possible to significantly reduce the internal resistance of the active material. The presence of aluminium combined with the carbon coating of the LMP particles creates a synergistic effect which very significantly reduces the internal resistance of the active material.

In addition to good electronic conductivity, the active material according to the invention has good thermal stability, which is explained by the presence of aluminium in the NCA lithiated oxide. The thermal stability can be evaluated using the differential scanning calorimetry (DSC) technique which provides an estimation of the temperature at which the active material becomes unstable in the presence of electrolyte and decomposes giving off energy in the form of heat. The higher the temperature of the peak measured by DSC, the more thermally stable the material. The lithiated oxide of transition metals used in the active material according to the invention comprises aluminium. The presence of aluminium makes it possible to shift the peak temperature towards higher values as shown by Table 2. The material according to the invention therefore presents a reduced risk of thermal runaway in comparison with a lithiated oxide of transition metals, in which the transition metals are constituted only by Ni and Co, such as Example 16 of the document US 2006/0216605.

The active material according to the invention can be advantageously used in the positive electrode of a lithium type accumulator. The latter then has a good cycling lifetime: its internal resistance varies little in the course of the cycling and the loss of electrochemical capacity is lower.

It was found that it is possible to prepare an electrode exhibiting a high loading of electrochemically active material without increasing the internal resistance of the electrode. Since the internal resistance of the positive electrode is low, the accumulator exhibits good performances in terms of power. The electrode can thus be used for electric applications requiring high discharge currents.

It is possible to prepare an electrode having a loading higher than 8 mg/cm$^2$/side (mg/cm$^2$/s), preferably at least 10 mg/cm$^2$/s and more preferably at least 20 mg/cm$^2$/s. Despite a high loading, the electrode impedance (or resistance) remains low. The electrode impedance may be obtained by calculating the ratio of the change in voltage ($\Delta V$) divided by the change in current ($\Delta I$) at specified times during a discharge pulse for a given state of charge. For example, the electrode may undergo a discharge test at a current of 20 C during 5 seconds for a state of charge of 50%; C being the measured discharge capacity of the cell when it is discharged in one hour. As another example of a standard test, the electrode may undergo a discharge test at a current of 30 C during 15 seconds for a state of charge of 50%. The internal resistance of the electrode is $R=\Delta V/\Delta I$. The area specific impedance ASI (Ohm.cm$^2$) is obtained by multiplying the internal resistance by the electrode area.

In one embodiment, for a state of charge of 50%, the ASI value measured for a discharge current of 30 C during 15 s is less 55000 Ohm.cm$^2$, preferably less than 45000 Ohm.cm$^2$. When the discharge test is carried out at a current of 20 C during 5 sec, the ASI value is less than 65 000 Ohm.cm$^2$, preferably less than 55000 Ohm.cm$^2$. Table 1 indicates the value of the internal resistance for:
an accumulator the positive electrode of which comprises only LPF and
an accumulator the positive electrode of which comprises 90% wt. LFP coated with carbon and 10% wt. Li(Ni$_{0.8}$Co$_{0.15}$Al$_{0.05}$)O$_2$

TABLE 1

|  | Loading (mg/cm$^2$) | Ah (cell) | Area (cm$^2$) | Ah/cm$^2$ | Impedance (Ohm) 50% SOC 15 sec 30 C. | Impedance (Ohm) 50% SOC 5 sec 20 C. | ASI (Ohm · cm$^2$) 15 sec 30 C. | ASI (Ohm · cm$^2$) 5 sec 20 C. |
|---|---|---|---|---|---|---|---|---|
| LFP | 8 | 27 | 29172 | 9.26 × 10$^{-4}$ | 2.05 |  | 59709 |  |
| 90% LFP/ 10% NCA | 10 | 30 | 25454 | 1.18 × 10$^{-3}$ | 1.60 | 1.99 | 40741 | 50687 |

Figure 9:
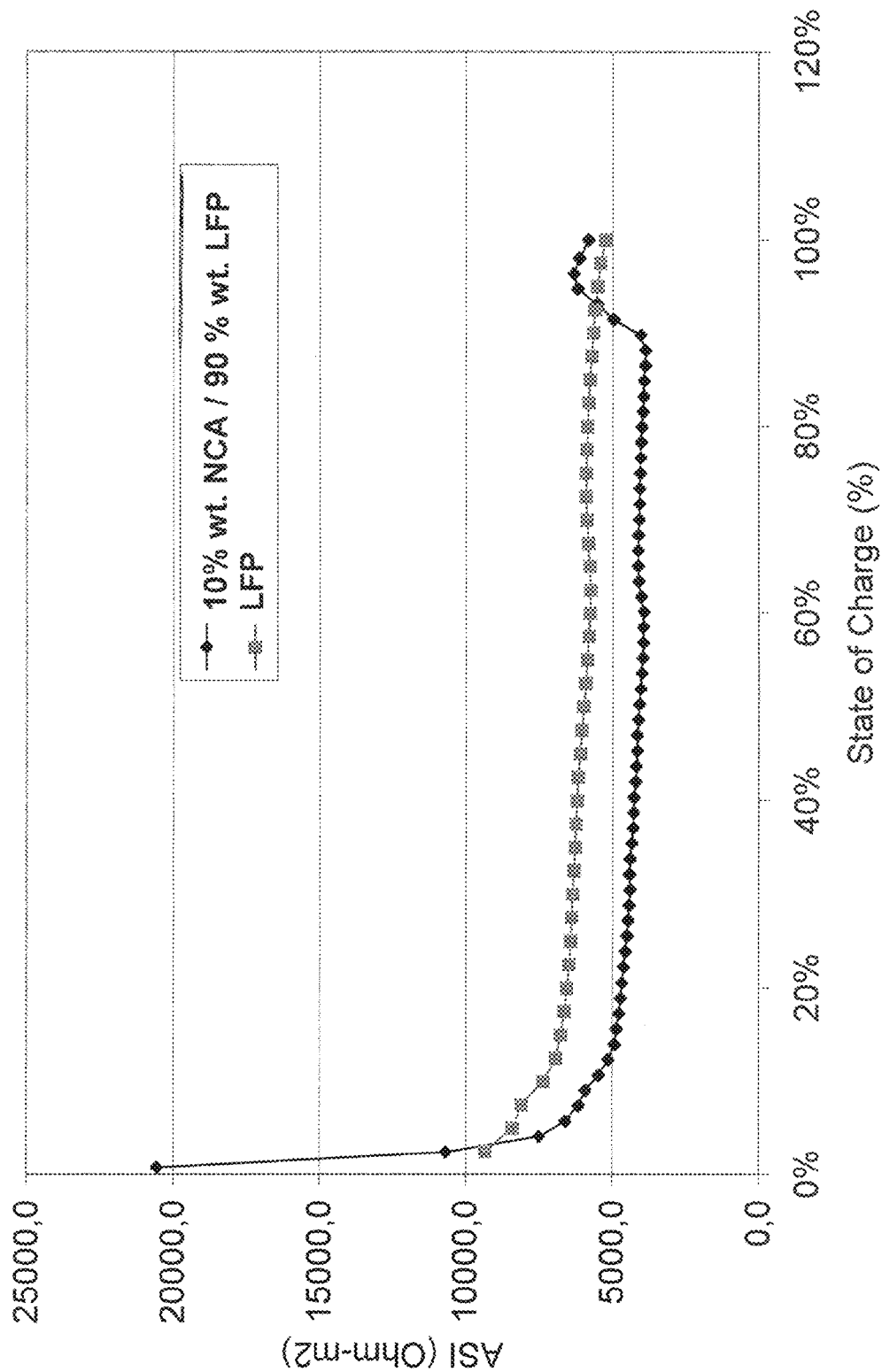
FIG. 9: Electrode impedance as a function of the state of charge for:
- an electrode according to the invention comprising 90 wt %. LFP coated with carbon and 10 wt. Li(Ni$_{0.8}$Co$_{0.15}$Al$_{0.05}$)O$_2$;
- an electrode comprising only LFP.

Despite a higher loading of 10 mg/cm$^2$, the accumulator comprising the electrode according to the invention exhibits a lower impedance. It is thus possible to prepare thicker, less porous electrodes and still have some improvement in power even at low temperature. FIG. 9 represents the accumulator impedance as a function of the state of charge for:
the accumulator according to the invention;
the accumulator the positive electrode of which comprises only LFP.
FIG. 9 shows that the accumulator according to the invention exhibits a lower impedance for a state of charge ranging from about 5% to about 90%.

Figure 2:
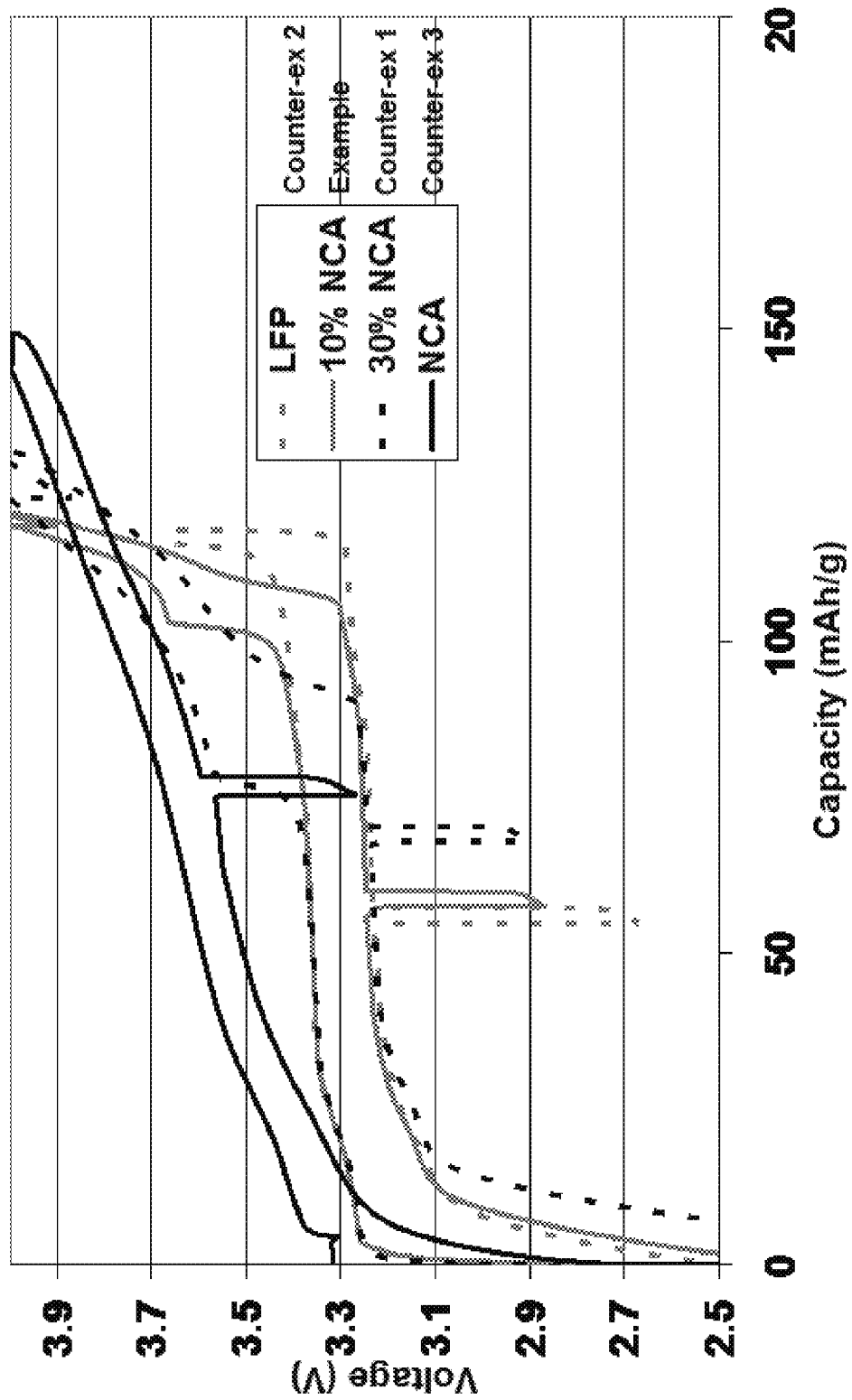
FIG. 2: Initial control cycle for the example according to the invention and the counter-examples 1, 2 and 3: charging at C/5 up to 3.65V (counter-example 2) or 4.0V (example according to the invention and counter-examples 1 and 3) then discharging at C/5 with a discharge current peak (pulse) of 5 C for 10 s at 50% depth of discharge for the example according to the invention and the counter-examples 1, 2 and 3. Counter-example 2 delivers all its capacity at 3.65 V. Charging at 4 V provides no more capacity. 3.65 V corresponds to 100% charge for counter-example 2.

The active material according to the invention is useful from the point of view of charging control. In fact, for a material of LMP type, the mechanism of insertion and desinsertion of the lithium induces a change of phase of the material which is biphased throughout charging and discharging, which fixes the cycling voltage. Therefore, the voltage of a material of LMP type does not depend on its state of charge. It is therefore difficult to monitor the state of charge of an accumulator the positive active material of which contains LMP. Managing the charging of an accumulator is therefore difficult. The voltage of a lithiated oxide of transition metal develops as a function of its lithiation level (mechanism of insertion and desinsertion of the lithium in solid solution). The voltage of a lithiated oxide of transition metal where the transition metal is chosen from Co, Ni, Al, Mn or a mixture thereof, therefore depends on its state of charge. It was discovered that the addition of NCA to the material LMP provided a signal making it possible to detect the end of charging. FIG. 2 shows a more rapid increase in voltage at the end of charging. The signal indicating the end of charging is obtained with only 10% NCA. In a module comprising several accumulators, this signal indicating the end of charging makes it possible to achieve equilibrium between the accumulators in order to optimize the charge of the module and avoid overcharging the accumulators. The safety of use of the accumulator module is therefore increased.

Figure 7:
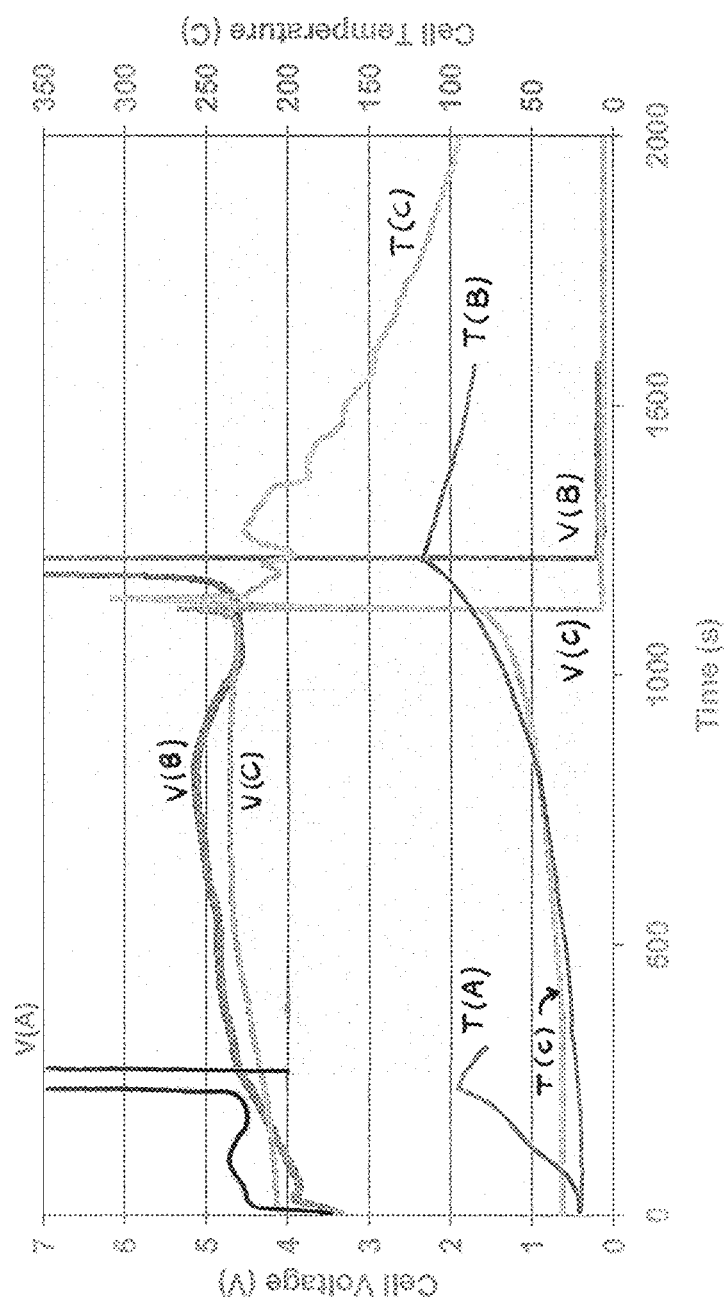
FIG. 7: Overcharge test of cells A, B and C

Also it was discovered that an electrode comprising the composition of the invention is more resistant to an overcharge than an electrode comprising LFP or NCA as an active material. FIG. 7 compares three cells exposed to an overcharge. The positive electrode of cell A contains LFP. The positive electrode of cell B contains a composition according to the invention, that is, a mixture comprising 90% wt LFP and 10% wt NCA. The positive electrode of cell C contains NCA. The cells are overcharged at a charging current of for example 2 C. A safety device interrupts charging when an unsafe operating condition is detected. The safety device may be a circuit breaker, such as a relay connected between the charging device and the cell. It may also be a thinning made in a portion of the wall of the cell container. The thinning is torn by excess pressure inside the container, the thinning, on being torn, interrupts electrical conduction between the electrodes of one polarity and the corresponding current output terminal. Such a safety device is disclosed in US 2006/019150. The charged capacity is measured until the safety device activates. FIG. 7 shows that overcharge of cell A and C is interrupted after 4.3 min and 18.4 min of overcharge time respectively while the overcharge of cell B according to the invention is interrupted only after 19.3 min. This is a surprising effect since one would expect that the interruption of the overcharge of cell B would occur between 4.3 min and 18.4 min. This results shows that a cell the positive electrode of which comprises the composition of the invention can be exposed safely to an overcharge condition for a longer period than for a cell the positive electrode of which comprises an electrode material of the prior art. The cell the positive electrode of which contains the composition of the invention may be charged up to about 150% of its nominal capacity. This is not a conventional charging mode. It corresponds to a situation wherein the cell is exposed to an overcharge situation. The advantage is that the overcharge is carried out up to a reversible limit.

The accumulator comprising the electrode according to the invention can be of lithium-ion or lithium polymer type. The accumulator according to the invention is used in the marine field, the fields of handheld devices, electric and hybrid vehicles, space, aeronautics, defense, telecommunications and emergency lighting equipment.

EXAMPLES

Several Compositions have been Produced

Composition according to the invention:
LiFePO$_4$ coated with carbon/Li(Ni$_{0.8}$Co$_{0.15}$Al$_{0.05}$)O$_2$=90%/10% by mass
Counter-example 1: LiFePO$_4$ coated with carbon/Li(Ni$_{0.8}$Co$_{0.15}$Al$_{0.05}$)O$_2$=70%/30%
Counter-example 2: 100% LiFePO$_4$ coated with carbon
Counter-example 3: 100% Li(Ni$_{0.8}$Co$_{0.15}$Al$_{0.05}$)O$_2$ The LiFePO$_4$ used in the example according to the invention and counter-examples 1 to 2 were synthesized and reduced to powder. The grains of LFP were then coated with carbon. The LFP used in the examples, with the exception of the comparative example of FIG. 6, is always coated with carbon. The electrode of the example according to the invention exhibits a loading of 23 mg/cm$^2$ per side.

Improvement in the Thermal Stability-DSC Measurements
Different accumulators were assembled, comprising:
 a positive electrode constituted by the positive active material Li(Ni$_{0.8}$Co$_{0.15}$Al$_{0.05}$)O$_2$, LiFePO$_4$ coated with carbon or Li(Ni$_{0.8}$Co$_{0.2}$)O$_2$
 An electrolyte constituted by a lithium salt and alkyl carbonate-based solvents
 A separator (for example polyethylene and/or polypropylene)
 A negative electrode constituted by Li metal.

The DSC measurements were carried out on the unwashed positive electrodes after cycling+charging (2-4.1V, C/20, ambient temperature).

The presence of aluminium in the material Li(Ni$_{0.8}$Co$_{0.15}$Al$_{0.05}$)O$_2$ improves the stability with respect to the material Li(Ni$_{0.8}$Co$_{0.2}$)O$_2$ (z=0) delaying the exothermic peak by 43° C. (Table 2).

TABLE 2

Thermal stability by DSC: comparison of the peak temperature of the materials Li(Ni$_{0.8}$Co$_{0.15}$Al$_{0.05}$)O$_2$ and Li(Ni$_{0.8}$Co$_{0.2}$)O$_2$ (z = 0).

| Composition of the positive active material | Peak temperature ° C. |
|---|---|
| Li(Ni$_{0.8}$Co$_{0.15}$Al$_{0.05}$)O$_2$ | 241 |
| Li(Ni$_{0.8}$Co$_{0.20}$)O$_2$ | 198 |

Figure 1:
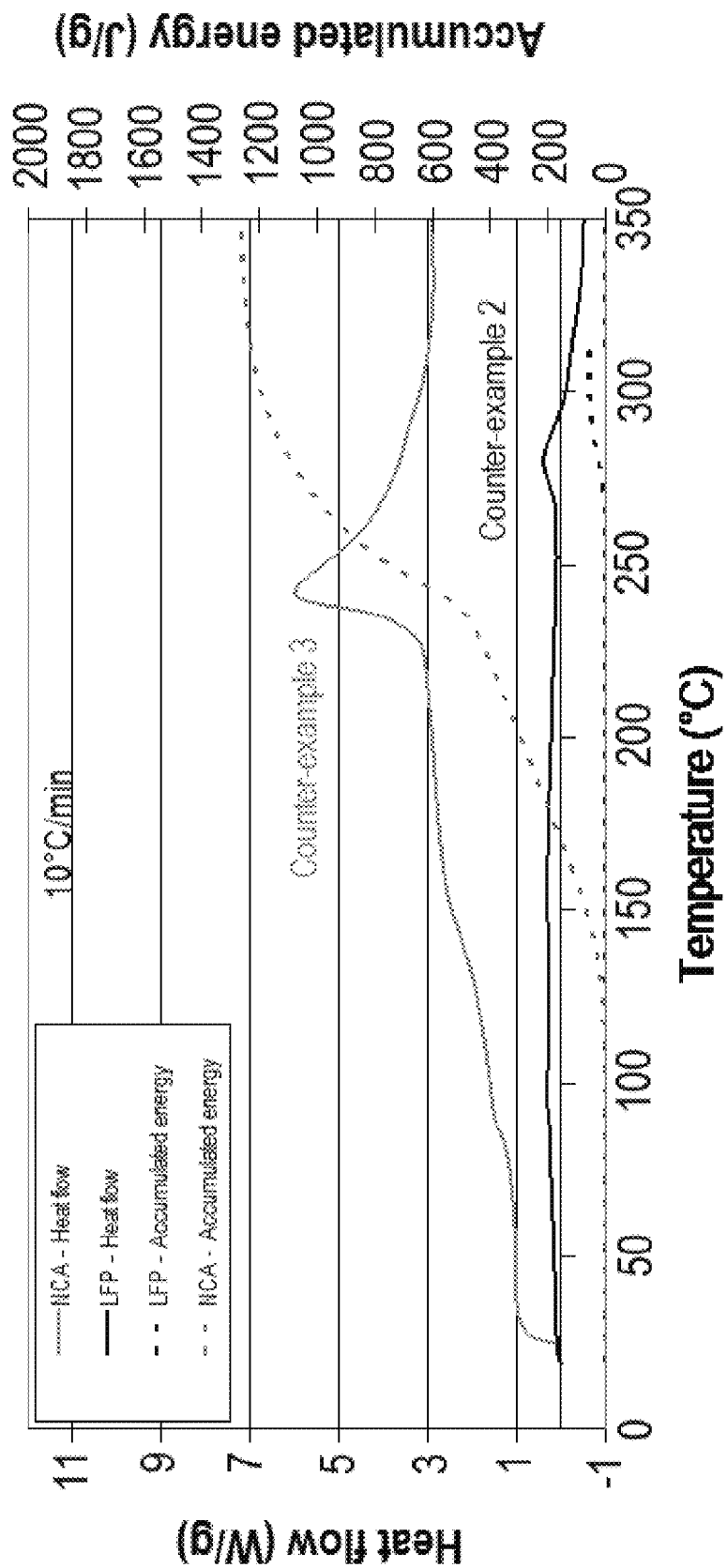
FIG. 1: Differential scanning calorimetry (DSC) curves of the material LiFePO$_4$ coated with carbon of counter-example 2 and of Li(Ni$_{0.8}$Co$_{0.15}$Al$_{0.05}$)O$_2$ of counter-example 3.

The mixture of LiFePO$_4$ coated with carbon with Li(Ni$_{0.8}$Co$_{0.15}$Al$_{0.05}$)O$_2$ (material of NCA type) greatly improves the thermal stability of the positive electrode compared with the case where Li(Ni$_{0.8}$Co$_{0.15}$Al$_{0.05}$)O$_2$ is used alone. The energy released for counter-example 2 is much less than for counter-example 3 and the exothermic peak is displaced towards higher values for counter-example 2 (FIG. 1). The released energy values for the composition of the example according to the invention and counter-examples 1 to 3 are listed in Table 3. For the composition of the example according to the invention and counter-example 1, these values were estimated taking into account the LiFePO$_4$ coated with carbon/Li(Ni$_{0.8}$Co$_{0.15}$Al$_{0.05}$)O$_2$ ratio and experimental values measured for each of the pure compounds: Counter-examples 2 and 3.

TABLE 3

Released energies measured (Counter-example 2 and 3 - FIG. 1) or estimated (Example according to the invention and counter-example 1).

| | Composition of the positive active material | Accumulated energy (J/g) |
|---|---|---|
| Example | LiFePO$_4$ coated with carbon/Li(Ni$_{0.8}$Co$_{0.15}$Al$_{0.05}$)O$_2$ = 90/10 | 178 (estimated) |
| Counter-example 1 | LiFePO$_4$ coated with carbon/Li(Ni$_{0.8}$Co$_{0.15}$Al$_{0.05}$)O$_2$ = 70/30 | 419 (estimated) |
| Counter-example 2 | 100% LiFePO$_4$ coated with carbon | 58 (measured) |
| Counter-example 3 | 100% Li(Ni$_{0.8}$Co$_{0.15}$Al$_{0.05}$)O$_2$ | 1260 (measured) |

Consequently, the mixture of $Li(Ni_{0.8}Co_{0.15}Al_{0.05})O_2$+ $LiFePO_4$ coated with carbon with at least 90% $LiFePO_4$ produces a significant improvement in terms of safety of use.

Measurement of the Internal Resistance Values:

Different cylindrical accumulators were assembled, comprising:
   a positive electrode constituted by the following positive active material:
      $LiFePO_4$ coated with carbon/$Li(Ni_{0.8}Co_{0.15}Al_{0.05})O_2$=90/10 (Example according to the invention)
      $LiFePO_4$ coated with carbon/$Li(Ni_{0.8}Co_{0.15}Al_{0.05})O_2$=70/30 (Counter-example 1)
      100% $LiFePO_4$ coated with carbon (Counter-example 2)
      100% $Li(Ni_{0.8}Co_{0.15}Al_{0.05})O_2$ (Counter-example 3)
   An electrolyte constituted by a lithium salt and alkyl carbonate-based solvents
   A separator (for example polyethylene and/or polypropylene)
   A negative electrode constituted by graphite.

Control cycles with a brief current discharge peak (pulse) were carried out according to the following procedure:
   charging at C/5 up to 3.65V (Counter-example 2) or 4.0V (example according to the invention, counter-examples 1 and 3)
   discharging at C/5 up to 2.5V with a current discharge peak of 5 C for 10 s at 50% depth of discharge.

The C/5 charging and C/5 discharging cycles with a current discharge peak (pulse) are represented in FIG. 2.

The internal resistance values R1 were calculated by the following formula:

$$Ri = [U(C/5) - U(5C, 10\ s)]/[I(5C) - I(C/5)]\ \text{where}$$

$U(C/5)$ represents the voltage value of the accumulator during the discharging at C/5 just before the pulse at 5 C,
$U(5\ C, 10\ s)$ represents the voltage value of the accumulator during the pulse at 5 C at 10 s,
$I(5\ C)$ and $I(C/5)$ represent the current values at the rates of C/5 and 5 C respectively. These values are then standardized by multiplying by the surface area of the positive electrode of the accumulator and the results expressed in ohm.cm² are shown in Table 4.

TABLE 4

Comparison of the standardized initial internal resistance values (in ohm · cm²) of the cylindrical accumulators of the example according to the invention and of the counter-examples 1, 2 and 3

| | Composition of the positive active material | Ri (Ohm · cm²) |
|---|---|---|
| Example according to the invention | $LiFePO_4$ coated with carbon/$Li(Ni_{0.8}Co_{0.15}Al_{0.05})O_2$ = 90/10 | 29 |
| Counter-example 1 | $LiFePO_4$ coated with carbon/$Li(Ni_{0.8}Co_{0.15}Al_{0.05})O_2$ = 70/30 | 26 |
| Counter-example 2 | 100% $LiFePO_4$ coated with carbon | 44 |
| Counter-example 3 | 100% $Li(Ni_{0.8}Co_{0.15}Al_{0.05})O_2$ | 17 |

It is clearly apparent that 100% $Li(Ni_{0.8}Co_{0.15}Al_{0.05})O_2$ (Counter-example 3) has the lowest internal resistance value and 100% $LiFePO_4$ coated with carbon (Counter-example 2) has the highest internal resistance value. The mixtures of $LiFePO_4$ coated with carbon/$Li(Ni_{0.8}Co_{0.15}Al_{0.05})O_2$=70/30 (Counter-example 1) and $LiFePO_4$ coated with carbon/$Li(Ni_{0.8}Co_{0.15}Al_{0.05})O_2$=90/10 (Example according to the invention) have internal resistances values closer to that of 100% $Li(Ni_{0.8}Co_{0.15}Al_{0.05})O_2$ than that of 100% $LiFePO_4$, although the quantity of $Li(Ni_{0.8}Co_{0.15}Al_{0.05})O_2$ in these mixtures is a minority portion. Furthermore, the compositions of the example according to the invention and of counter-example 1 have very similar internal resistance values. Therefore, the mixture of $LiFePO_4$ coated with carbon/$Li(Ni_{0.8}Co_{0.15}Al_{0.05})O_2$=90/10 (Example according to the invention) provides better thermal stability than the mixture of $LiFePO_4$ coated with carbon/$Li(Ni_{0.8}Co_{0.15}Al_{0.05})O_2$=70/30 (Counter-example 1) while reducing the internal resistance of the accumulator to almost the same extent.

Figure 3:
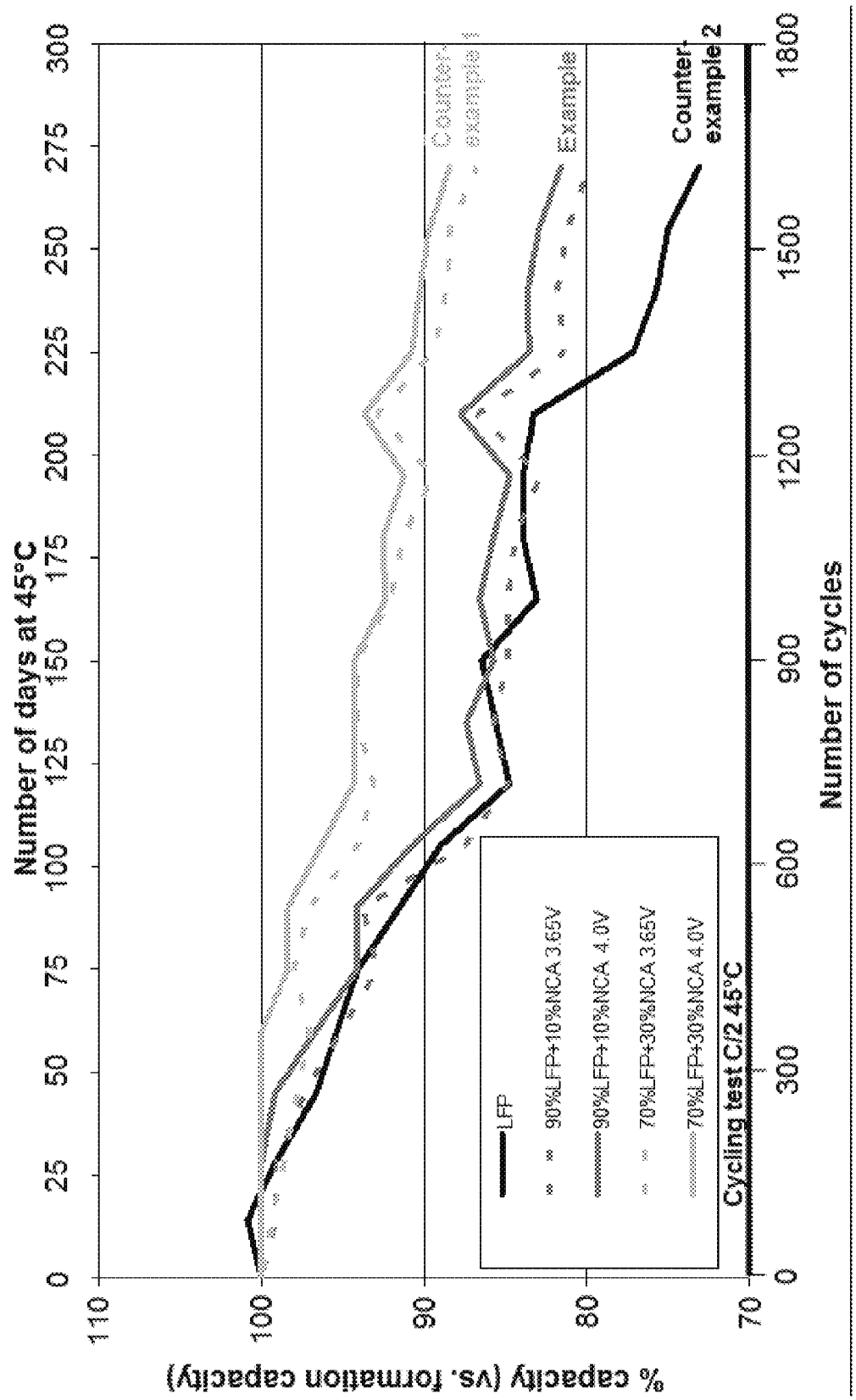
FIG. 3: Development of capacity during cycling at the rate of C/2 at 45° C. for the example according to the invention and counter-examples 1 and 2. The capacity is measured during control cycles carried out at a current of C/5 and 25° C.

Stability of the Internal Resistance Values and Electrochemical Capacity During Cycling The cylindrical accumulators were cycled at the rate of C/2 at 45° C. Every 15 days, two control cycles were carried out at 25° C.

first cycle: charging at C/5 up to 3.65V, discharging at C/5 up to 2.5V with a discharge peak of 5 C for 10 s at 50% of the discharge;
   second cycle: charging at C/5 up to 4.0V, discharging at C/5 up to 2.5V with a discharge peak of 5 C for 10 s at 50% of the discharge The development of the discharged capacity measured during the control cycles is represented in FIG. 3. The development of the internal resistances expressed in ohm.cm² is represented in FIG. 4.

It can be clearly seen in FIG. 3 that the loss of capacity decreases with the increase in the percentage of $Li(Ni_{0.8}Co_{0.15}Al_{0.05})O_2$ in the mixture.

Figure 4:
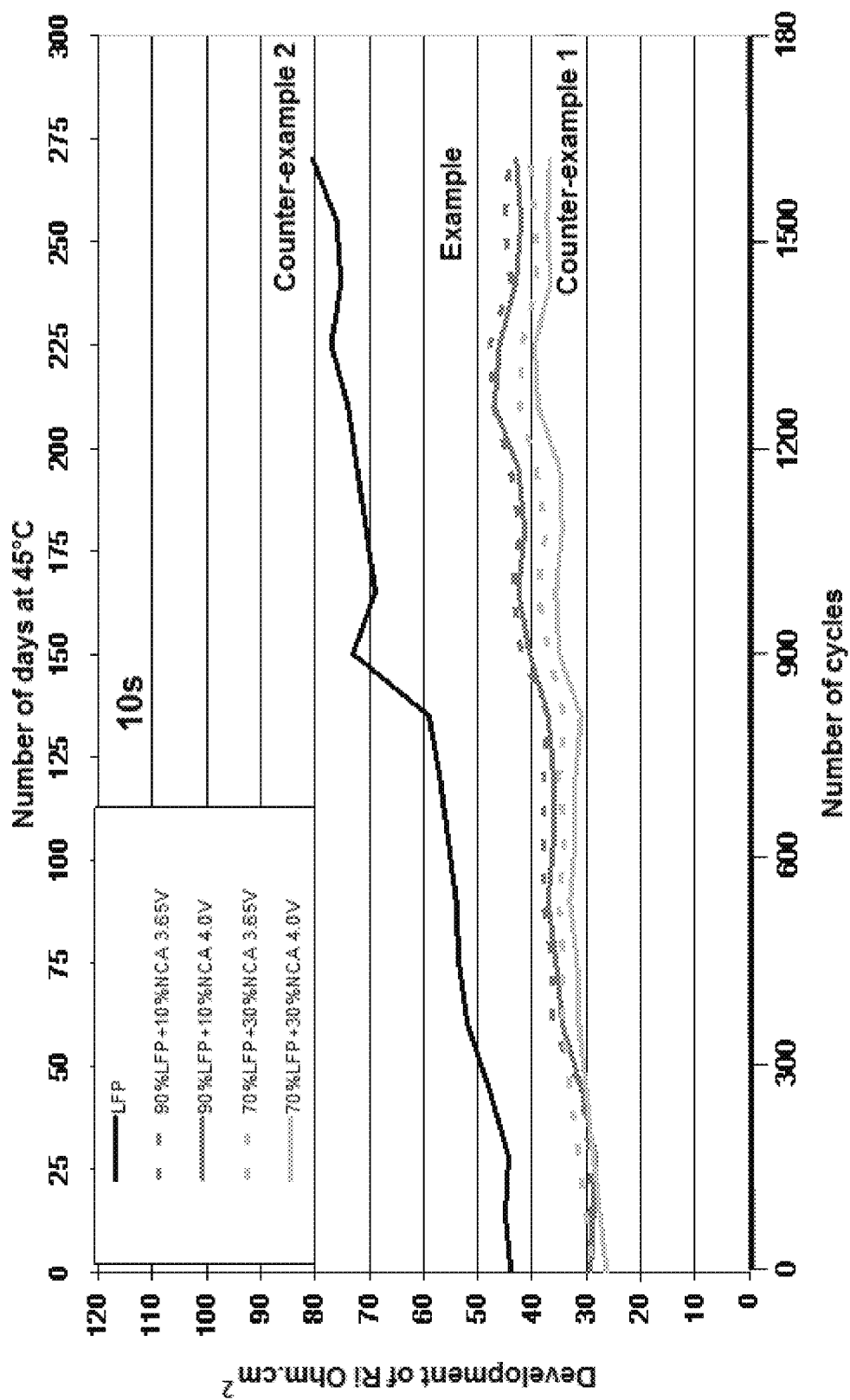
FIG. 4: Development of internal resistance during a cycling at the discharge rate of C/2 at 45° C. for the example according to the invention and counter-examples 1 and 2. The internal resistance is measured by producing a discharge current peak (pulse) with a current of 5 C for 10 s at 50% depth of discharge during control cycles, in which the accumulator is discharged at the rate of C/5 at 25° C.

FIG. 4 clearly shows that the addition of $Li(Ni_{0.8}Co_{0.15}Al_{0.05})O_2$ to the mixture reduces by half the increase in internal resistance during the cycling (+40% vs +90%). This stabilization is the same irrespective of the level of $Li(Ni_{0.8}Co_{0.15}Al_{0.05})O_2$ in the mixture. On the other hand, the mixture of $LiFePO_4$ coated with carbon/$Li(Ni_{0.8}Co_{0.15}Al_{0.05})O_2$=90/10 (Example) is thermally more stable than the mixture of $LiFePO_4$ coated with carbon/$Li(Ni_{0.8}Co_{0.15}Al_{0.05})O_2$=70/30 (Counter-example 1).

In order to take into account the different advantages offered by the composition in the example according to the invention, compared with the other mixtures tested (Counter-examples), the results obtained with the 4 mixtures (thermal stability, initial internal resistance, cycling stability in terms of capacity and internal resistance) are shown in Table 5. It is therefore demonstrated that the example according to the invention offers the best compromise between these different properties. In fact, if the symbols ++, +, − and −− are used to indicate that the property is very good, good, poor or very poor, the example according to the invention is the only positive material to have only the signs + or ++. Thus, the counter-examples 1 and 3 have signs − and −− on the thermal stability, whereas the counter-example 2 has signs −− on the initial internal resistance, the stability of the internal resistance during cycling and the retention of electrochemical capacity during cycling.

TABLE 5

Summary table of the different properties (thermal stability, initial internal resistance, stability during cycling) of the different examples of active material tested.

| | Composition of positive active material | Thermal stability | initial Ri | Stability of Ri during cycling | Retention of capacity during the cycling |
|---|---|---|---|---|---|
| Example | LiFePO$_4$ coated with carbon/ Li(Ni$_{0.8}$Co$_{0.15}$Al$_{0.05}$)O$_2$ = 90/10 | + | + | ++ | + |
| Counter-example 1 | LiFePO$_4$ coated with carbon/ Li(Ni$_{0.8}$Co$_{0.15}$Al$_{0.05}$)O$_2$ = 70/30 | – | + | ++ | ++ |
| Counter-example 2 | 100% LiFePO$_4$ coated with carbon | ++ | – – | – – | – – |
| Counter-example 3 | 100% Li(Ni$_{0.8}$Co$_{0.15}$Al$_{0.05}$)O$_2$ | – – | ++ | ++ | ++ |

Four different electrode compositions were tested. They are summarized in Table 6 below:

Counter-example 4 is a mixture of uncoated LFP with NC. The term "NC" refers to a lithiated oxide comprising nickel and cobalt but devoid of aluminium; the compound Li(Ni$_{0.8}$Co$_{0.2}$)O$_2$ is used in counter examples 4 and 5.

Counter-example 5 is a mixture of coated LFP with NC;

Counter-example 6 is a mixture of uncoated LFP with NCA,

Example according to the invention is a mixture of carbon-coated LFP with NCA.

TABLE 6

| | LFP uncoated | LFP coated with carbon |
|---|---|---|
| NC | Counter-example 4 | Counter-example 5 |
| NCA | Counter-example 6 | Example according to the invention |

Figure 8:
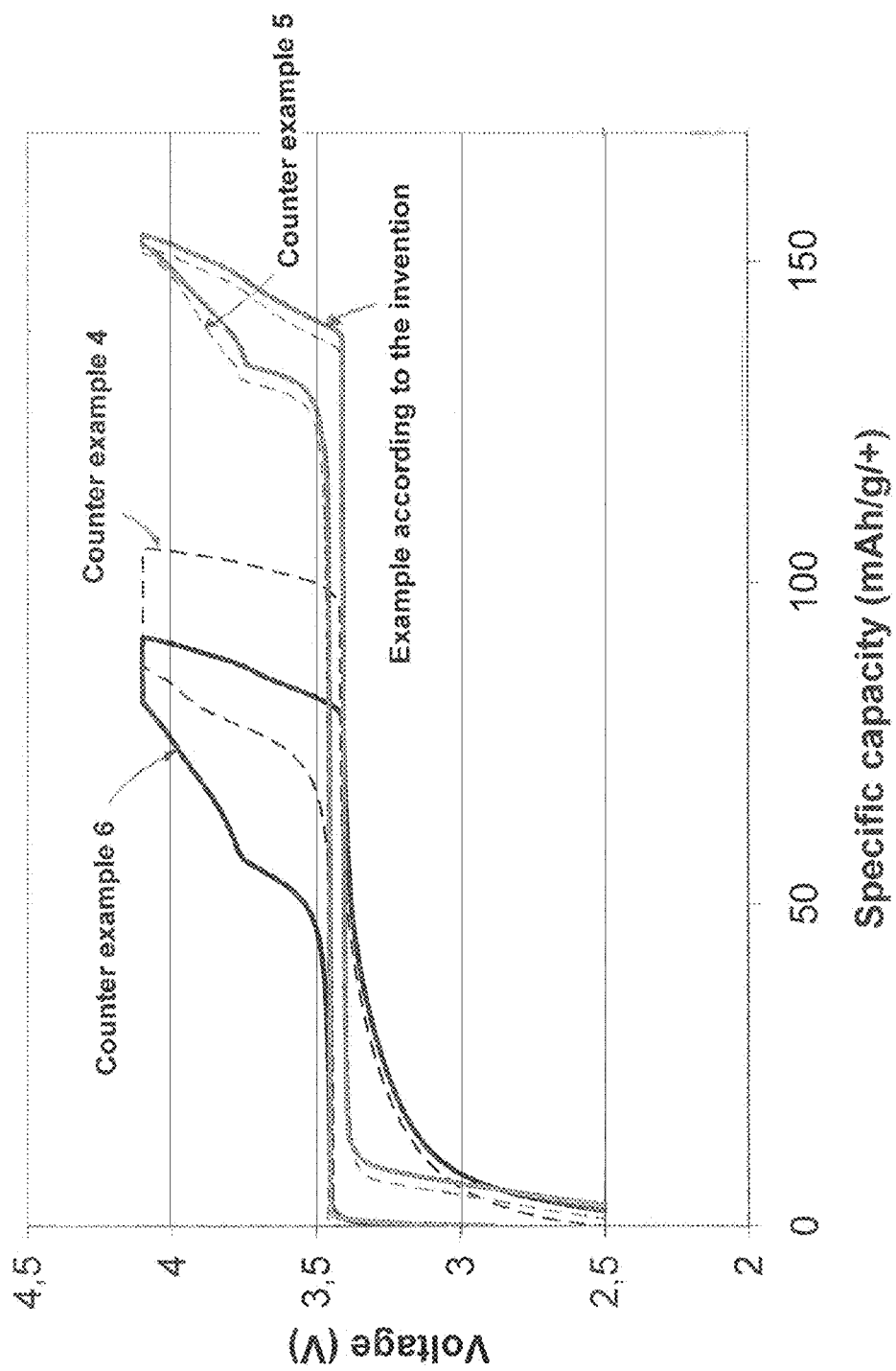
FIG. 8: Charging and discharging curves for the cells of counter examples 4, 5 and 6 and the example according to the invention. Discharge is performed at a temperature of 60° C. at a discharge current of C/20, C being the measured discharge capacity of the cell when it is discharged in one hour.

Four coin cells tests were fabricated. Each cell has a positive electrode comprising one of the compositions indicated in Table 6 and a negative electrode made of lithium. FIG. 8 displays the charge and discharge curves for each of these four examples. The cells were discharged at 60° C. at a discharge current of C/20, C being the measured discharge capacity of the cell when it is discharged in one hour. The results of FIG. 8 show that the presence of carbon as a coating around the particles of LFP allows obtaining higher capacity values.

In order to determine the internal resistance (IR) of the cells comprising the compositions of Table 6, discharge tests were carried out at room temperature at a discharge current of IC during 18 s and at a depth of discharge (DOD) of 50%. The results are shown in Table 7.

TABLE 7

Internal resistance values obtained from 18 s pulses at room temperature for a depth of discharge of 50% - Two values indicate that the results come from two cells.

| | IR (Ohm · cm$^2$) | |
|---|---|---|
| | LFP uncoated | LFP-C |
| NC | Did not pass | 86/98 |
| NCA | 876 | 64/65 INVENTION |

For counter-example 4 (no carbon, no aluminium), no value of internal resistance could be measured since the cut-off voltage was reached. A significant improvement in terms of internal resistance is observed when LFP particles are coated with carbon. Indeed, the comparison between Counter-Example 6 and the Example according to the invention shows that the internal resistance is divided by at least 10. The comparison between Counter-example 5 and the Example according to the invention shows that the presence of Al also allows decreasing the internal resistance. In conclusion, the electrode comprising the composition according to the invention shows a lower internal resistance values, indicating a synergetic effect of the carbon coating on the LFP particles and the presence of aluminium in the NCA compound.

The invention claimed is:

1. Composition comprising:
    a) a lithiated oxide of transition metals containing at least nickel, cobalt and aluminium; and
    b) a lithiated phosphate of at least one transition metal, the surface of which is at least partially covered by a layer of carbon, wherein
    the proportion by mass of the lithiated oxide is equal to 10% of the weight of the composition;
    the proportion by mass of the lithiated phosphate is equal to 90% of the weight of the composition;
    the lithiated oxide has the formula Li$_w$(Ni$_x$,Co$_y$,Al$_z$)O$_2$, where
    w ranges from 0.9 to 1.1, $0.75 \leq x \leq 0.85$, $0.10 \leq y \leq 0.20$, $0.02 \leq z \leq 0.15$, and $x+y+z=1$; and the lithiated phosphate has the formula Li$_a$Fe$_b$P$_c$O$_{4-t}$, where
    a, b and c range from 0.9 to 1.1, and
    t is less than or equal to 0.4.

2. Composition according to claim 1, in which the lithiated phosphate has the formula LiFePO$_4$.

3. Composition according to claim 2, in which x=0.80; y=0.15 and z=0.05.

4. Accumulator comprising:
a non-aqueous electrolyte,
at least one negative electrode and
at least one positive electrode comprising the composition according to claim 3.

5. Accumulator according to claim 4, of lithium-ion or lithium-polymer type.

6. Composition according to claim 1, in which:

$0.05 \leq z \leq 0.10$.

7. Composition according to claim 1, in which x=0.80; y=0.15 and z=0.05.

8. Electrode comprising the composition according to claim 1.

9. Electrode according to claim 8 having a loading of electrochemically active material higher than 8 mg/cm²/s.

10. Electrode according to claim 9 having a loading of electrochemically active material of at least 20 mg/cm²/s.

11. Electrode according to claim 8 having a ASI value (area-specific impedance value) measured for a discharge current of 30 C during 15 s of less than 55000 Ohm.cm² or a AST ASI value measured for a discharge current of 20 C during 5 s of less than 65 000 Ohm.cm² at a state of charge of about 50%.

12. Electrode according to claim 11 having a ASI value measured for a discharge current of 30 C during 15 s of less than 45000 Ohm.cm² at a state of charge of about 50%.

13. Electrode according to claim 11 having a ASI value measured for a discharge current of 20 C during 5 s of less than 55000 Ohm.cm² at a state of charge of about 50%.

14. Accumulator comprising:
a non-aqueous electrolyte,
at least one negative electrode and
at least one positive electrode which is according to claim 8.

15. Accumulator according to claim 14, of lithium-ion or lithium-polymer type.

16. Composition according to claim 1 in which $0.05 \leq z \leq 0.15$.

17. Composition comprising:
a) a lithiated oxide of transition metals containing at least nickel, cobalt and aluminium; and
b) a lithiated phosphate of at least one transition metal, the surface of which is at least partially covered by a layer of carbon, wherein
the proportion by mass of the lithiated oxide is equal to 10% of the weight of the composition;
the proportion by mass of the lithiated phosphate is equal to 90% of the weight of the composition;
the lithiated oxide has the formula $Li_w(Ni_xCo_yAl_z)O_2$, where
w ranges from 0.9 to 1.1, $0.75 \leq x \leq 0.85$, $0.10 \leq y \leq 0.20$, $0.02 \leq z \leq 0.15$, and $x+y+z=1$; and the lithiated phosphate has the formula $Li_aM_bP_cO_{4-t}$, where
M represents Fe and Mn,
a, b and c range from 0.9 to 1.1, and
t is less than or equal to 0.4.

18. Composition according to claim 17, wherein $0.05 \leq z \leq 0.15$.

19. Composition according to claim 17, wherein $0.05 \leq z \leq 0.10$.

20. Composition according to claim 17, in which x=0.80; y=0.15 and z=0.05.

21. Electrode comprising the composition according to claim 17.

22. Electrode according to claim 21 having a loading of electrochemically active material higher than 8 mg/cm²/s.

23. Electrode according to claim 21 having a loading of electrochemically active material of at least 20 mg/cm²/s.

24. Electrode according to claim 21 having a ASI value (area-specific impedance value) measured for a discharge current of 30 C during 15 s of less 55000 Ohm.cm² or a ASI value measured for a discharge current of 20 C during 5 s of less than 65 000 Ohm.cm² at a state of charge of about 50%.

25. Electrode according to claim 24 having a ASI value measured for a discharge current of 20 C during 5 s of less than 45000 Ohm.cm2 at a state of charge of about 50%.

26. Electrode according to claim 24 having a ASI value measured for a discharge current of 20 C during 5 s of less than 55000 Ohm.cm2 at a state of charge of about 50%.

27. Process of charging the accumulator of claim 14 at a charging current of at least 2 C wherein the charged capacity represents at least 150% of the nominal capacity for a cut-off voltage of 3.6 V or at least 140% of the nominal capacity for a cut-off voltage of 4.1 V.

28. Process according to claim 27, wherein the charged capacity represents at least 155% of the nominal capacity for a cut-off voltage of 3.6 V or at least 145% of the nominal capacity for a cut-off voltage of 4.1 V.

* * * * *